United States Patent [19]
Haun et al.

[11] Patent Number: 5,527,750
[45] Date of Patent: Jun. 18, 1996

[54] CATALYST REGENERATION PROCEDURE FOR SULFUR-SENSITIVE CATALYSTS

[75] Inventors: Edward C. Haun, deceased, late of Glendale Heights, by Charlene Haun, executor; Charles T. Ressl, Mount Prospect, both of Ill.

[73] Assignee: UOP, Des Plaines, Ill.

[21] Appl. No.: 365,662

[22] Filed: Dec. 29, 1994

[51] Int. Cl.$^6$ .................................................... B01J 20/34
[52] U.S. Cl. ............................... 502/20; 502/38; 502/44; 502/56
[58] Field of Search .................... 502/20, 38, 44, 502/56

[56] References Cited

U.S. PATENT DOCUMENTS

| | | | |
|---|---|---|---|
| 2,792,337 | 5/1957 | Engel | 196/50 |
| 2,873,176 | 2/1959 | Hengstebeck | 23/288 |
| 2,923,679 | 2/1960 | Thomson | 208/140 |
| 3,137,646 | 6/1964 | Capsuto | 208/65 |
| 4,610,972 | 9/1986 | Hughes | 502/52 |
| 4,865,826 | 9/1989 | Carnell et al. | 423/230 |

*Primary Examiner*—E. Rollins Cross
*Assistant Examiner*—Alexander G. Ghyka
*Attorney, Agent, or Firm*—Thomas K. McBride; John G. Tolomei

[57] ABSTRACT

A method of regenerating a sulfur-sensitive hydrocarbon conversion catalyst by employing sulfur-contaminated heat-transfer equipment of a hydrocarbon conversion process is disclosed. This method is useful for the regeneration of reforming catalysts comprising L-zeolite.

18 Claims, 1 Drawing Sheet

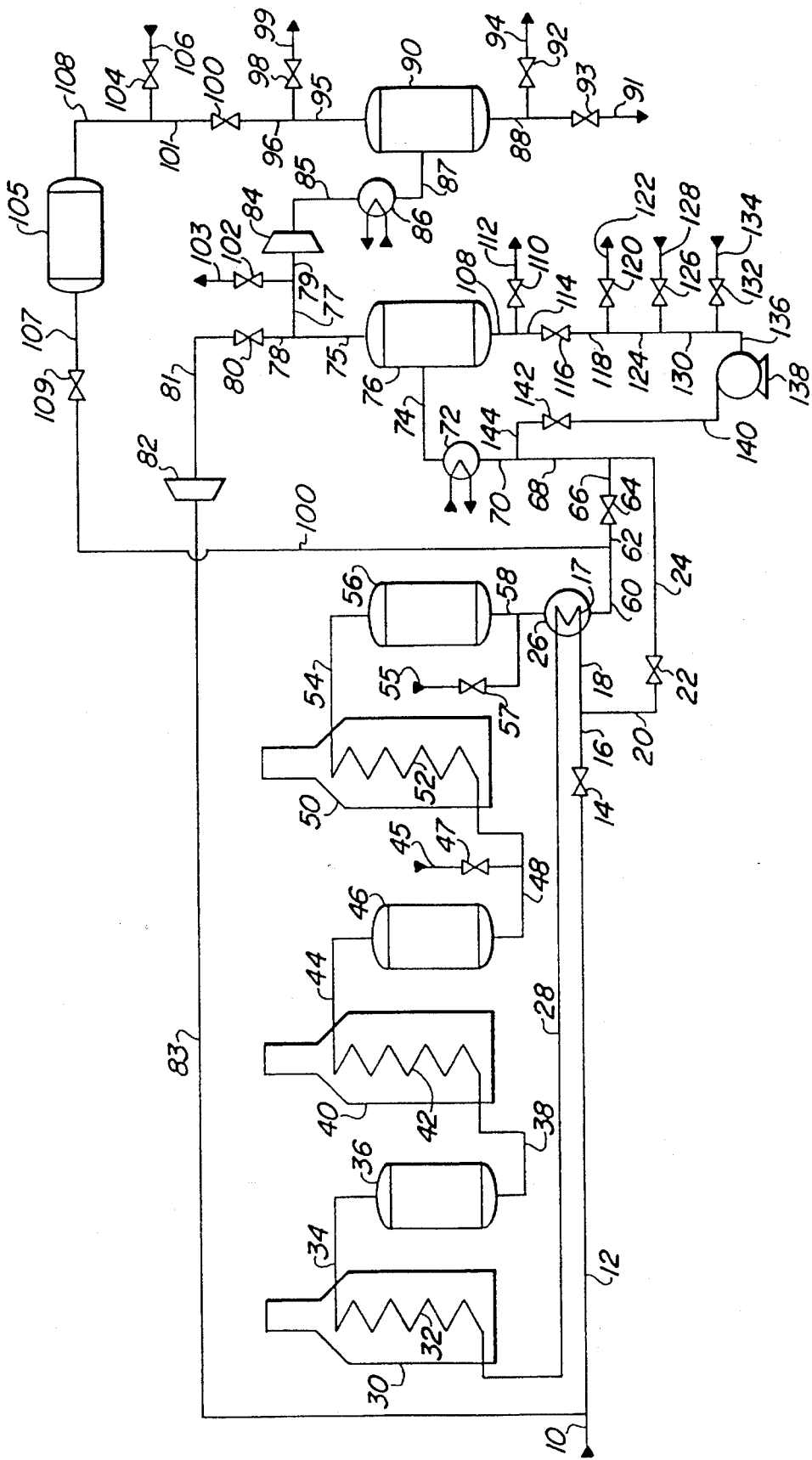

CATALYST REGENERATION PROCEDURE FOR SULFUR-SENSITIVE CATALYSTS

FIELD OF THE INVENTION

The present invention relates to the regeneration of hydrocarbon conversion catalysts that are sulfur-sensitive and more specifically to catalysts used for the catalytic reforming of gasoline-range hydrocarbons.

BACKGROUND OF THE INVENTION

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline and the rising demands of high-performance internal-combustion engines are increasing the required knock resistance of the gasoline component as measured by gasoline "octane" number. The catalytic reforming unit, therefore, must operate more efficiently at higher severity in order to meet these increasing aromatics and gasoline-octane needs. This trend creates a need for more effective reforming catalysts for application in new and existing process units.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction, thus producing a higher yield of aromatics and a lower output of fuel gas, while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates, as well as naphthas, has been disclosed. The increased sensitivity to feed sulfur of these selective catalysts also is known.

Catalytic processes for the conversion of hydrocarbons are well known and extensively used. Invariably, the catalysts used in these processes become deactivated for one or more reasons. Where the accumulation of coke deposits causes the deactivation, regeneration of the catalyst to remove coke deposits restores the activity of the catalyst. Coke is normally removed from the catalyst by contact of the coke-containing catalyst at high temperature with an oxygen-containing gas to combust and remove the coke. This regeneration can be carried out in situ or the catalyst may be removed from the reactor where the hydrocarbon conversion takes place and transported to a separate regeneration zone for coke removal.

Many hydrocarbon conversion processes, such as naphtha reforming process, employ two or more separate reactors through which a hydrocarbon feed stream passes in series. Typically, each reactor contains a bed of catalyst. The hydrocarbon feed stream passes from one reactor to the next reactor in series through conduits. In naphtha reforming, the hydrocarbon conversion reactions are endothermic, and, therefore, a heater is typically located upstream of each reactor in order to provide the necessary heat of reaction to the hydrocarbon feed stream. In addition, an indirect heat exchanger is typically located downstream of the last reactor in the series, in order to conserve energy by recovering heat from the effluent stream and transferring that heat to the feed stream upstream of the first heater.

In hydrocarbon conversion processes employing two or more reactors, arrangements for regenerating the hydrocarbon conversion catalyst in situ semi-continuously are well known. In semi-continuous regeneration, all of the reactors are periodically taken out of service and are regenerated by passing the oxygen-containing gas through the reactors in series. The oxygen-containing gas passes from one reactor to the next reactor through the heaters, heat exchangers, and conduits through which the hydrocarbon-feed stream passes when hydrocarbon conversion takes place.

The hydrocarbon feed streams of hydrocarbon conversion processes often contain sulfur. During hydrocarbon conversion, sulfur in the feed stream deposits on the surfaces of the heaters, heat exchangers and conduits which the feed stream contacts. Where iron is a component of these surfaces, the sulfur may react with the iron to form iron sulfide. Most of the deposition on and reaction with these surfaces that occurs takes place upstream of the first reactor. Consequently, in a naphtha reforming process, the indirect heat exchanger, the heater and the conduits upstream of the first reactor gradually become contaminated with sulfur.

When a catalyst is regenerated in situ in a hydrocarbon conversion process that has become contaminated with sulfur, the oxygen in the regeneration gas reacts with the sulfur to form sulfur oxide. When sulfur oxide contacts the catalyst, the catalyst may be affected in a manner such that its subsequent performance during hydrocarbon conversion is worsened. For example, depending on the particular catalyst, the regeneration conditions and the subsequent hydrocarbon conversion conditions, contacting the catalyst with sulfur oxide may displace a halogen from the catalyst or it may promote the agglomeration of catalytic metals on the catalyst. The result of either of these changes to the catalyst may adversely affect the activity and selectivity of the catalyst in promoting the desired hydrocarbon conversion reactions.

Various methods have been proposed in the prior art for regenerating sulfur-sensitive catalysts, but these methods either do not preclude the risk of contacting the catalyst with sulfur, or they require the use of additional expensive equipment. The requirement of additional expensive equipment can best be illustrated in terms of regenerating a sulfur-sensitive catalyst in a catalytic reforming process. In a catalytic reforming process, sulfur that is present in the feed stream tends to deposit on the heat exchange surfaces (tubes) of the combined feed exchanger and the charge heater. Consequently, during regeneration according to prior art processes, the sulfur-contaminated combined feed exchanger and charge heater are not used to heat the oxygen-containing streams that regenerate sulfur-sensitive catalysts, because sulfur oxide forms when oxygen contacts the tubes of the combined feed exchanger and the heater. If this sulfur oxide were passed over the sulfur-sensitive catalyst, then the select physical properties and catalytic performance of the catalyst would be damaged. Therefore, in order to avoid this risk, the combined feed exchanger and the charge heater are not employed during regeneration to heat oxygen-containing streams flowing to catalyst beds. Instead, in prior art processes, a separate regeneration exchanger and regeneration heater must be employed for this purpose. Consequently, in these prior art regeneration processes, the combined feed exchanger and the charge heater sit idle when the catalyst is being regenerated and the regeneration exchanger and regeneration heater sit idle when the catalyst is being used for reforming hydrocarbons. In short, the prior art processes require two exchangers and two heaters, because the combined feed exchanger and the charge heater cannot be employed usefully during regeneration.

Therefore, there is a need for a method of regenerating a sulfur-sensitive catalyst in a hydrocarbon conversion unit that is contaminated with sulfur in a manner that the catalyst is not contacted with sulfur.

SUMMARY OF THE INVENTION

This invention employs sulfur-contaminated heat transfer equipment that would otherwise sit idle during regeneration because of the risk it might pose to poisoning the catalyst with sulfur. In this invention, the sulfur-contaminated heat transfer equipment is used during regeneration in a manner that transfers heat to the oxygen-containing stream entering the bed of sulfur-sensitive catalyst but without the risk of poisoning the catalyst with sulfur. Therefore, according to this invention, no additional heat transfer equipment is necessary.

This invention is useful for the regeneration of a sulfur-sensitive catalyst used in catalytic hydrocarbon conversion processes that employ a combined feed exchanger and a charge heater and where the hydrocarbon conversion process results in sulfur-contamination of the combined feed exchanger and the charge heater. According to this invention, the sulfur-contaminated combined feed exchanger, the sulfur-contaminated charge heater, or both may be used during the regeneration of the sulfur-sensitive catalyst.

It is an objective of this invention to regenerate a sulfur-sensitive catalyst in a hydrocarbon conversion unit that is contaminated with sulfur using a procedure that does not contact the catalyst with sulfur. It is a further objective of this invention to regenerate a sulfur-sensitive catalyst in a hydrocarbon conversion unit using a procedure that maximizes the use of existing equipment, even though it is contaminated with sulfur, and minimizes the need for additional equipment that is used during regeneration only and that sits idle the rest of the time.

In one embodiment, this invention is a method of contacting a sulfur-sensitive catalyst with oxygen in a catalytic hydrocarbon conversion process that employs the sulfur-sensitive catalyst and that comprises a means for indirect heat exchange which comprises a surface on which sulfur is deposited. A feed stream comprising hydrocarbons and sulfur contacts a surface of a means for indirect heat exchange and deposits sulfur on the surface to produce a charge stream. The charge stream contacts a bed of a sulfur-sensitive catalyst. The contacting of the feed stream with the surface, and the charge stream with the catalyst, is discontinued. A regeneration stream comprising an inert compound and oxygen contacts the catalyst, and a first gas stream comprising the inert compound and oxygen is withdrawn from the bed. At least a portion of the first gas stream contacts the surface. While the portion of the first gas stream is heat exchanged in the means for indirect heat exchange, oxygen in the first gas stream reacts with at least a portion of the sulfur deposited on the surface to produce a second gas stream comprising the inert compound and sulfur oxide. At least a portion of the sulfur oxide is removed from at least a portion of the second gas stream to produce a third gas stream comprising the inert compound. At least a portion of the third gas stream is heat exchanged in the means for indirect heat exchange. The heat-exchanged portion of the third gas stream is combined with oxygen to form the regeneration stream.

In a second embodiment, this invention is a method of contacting a sulfur-sensitive catalyst with oxygen in a catalytic hydrocarbon conversion process that employs the sulfur-sensitive catalyst, that comprises a means for indirect heat exchange which comprises a first surface on which sulfur is deposited, and that comprises a means for heat exchange which comprises a second surface on which sulfur is deposited. An inlet stream comprising hydrocarbons and sulfur contacts a first surface of a means for indirect heat exchange and deposits sulfur on the first surface to produce a feed stream. The feed stream comprising hydrocarbons and sulfur contacts a second surface of a means for heat exchange and deposits sulfur on the second surface to produce a charge stream. The charge stream contacts a bed of a sulfur-sensitive catalyst. The contacting of the inlet stream with the first surface, the feed stream with the second surface, and the charge stream with the catalyst, is discontinued. A regeneration stream comprising an inert compound and oxygen contacts the catalyst, and a first gas stream comprising the inert compound and oxygen is withdrawn from the bed. At least a portion of the first gas stream contacts the second surface. While the portion of the first gas stream is heat exchanged in the means for heat exchange, oxygen in the first gas stream reacts with at least a portion of the sulfur deposited on the second surface to produce a second gas stream comprising the inert compound and sulfur oxide. At least a portion of the second gas stream contacts the first surface. While the portion of the second gas stream is heat exchanged in the means for indirect heat exchange, oxygen in the second gas stream reacts with at least a portion of the sulfur deposited on the first surface to produce a third gas stream comprising the inert compound and sulfur oxide. At least a portion of the sulfur oxide is removed from at least a portion of the third gas stream to produce a fourth gas stream comprising the inert compound. At least a portion of the fourth gas stream is heat exchanged in the means for indirect heat exchange. The heat-exchanged portion of the fourth gas stream is combined with oxygen to form the regeneration stream.

In a third embodiment, this invention is a method of combusting coke from a sulfur-sensitive catalyst using oxygen in a catalytic hydrocarbon conversion process that employs the sulfur-sensitive catalyst, that comprises an indirect heat exchanger which comprises a first surface on which sulfur is deposited, and that comprises an indirect heater which comprises a second surface on which sulfur is deposited. An inlet stream comprising hydrocarbons and sulfur contacts a first surface of the indirect heat exchanger and, while heating the inlet stream, deposits sulfur on the first surface to produce a feed stream. The feed stream comprising hydrocarbons and sulfur contacts a second surface of the indirect heater and deposits sulfur on the second surface while heating the feed stream to produce a charge stream. The charge stream contacts a bed of a sulfur-sensitive catalyst at hydrocarbon conversion conditions and deposits coke on the catalyst which deactivates the catalyst. An effluent stream comprising hydrogen, light hydrocarbons, and heavy hydrocarbons is withdrawn from the bed of catalyst and is passed to a separation zone. A first process gas stream comprising hydrogen and the light hydrocarbons and a first process liquid stream comprising the heavy hydrocarbons are recovered from the separation zone. The first process gas stream is passed to a purification zone. A second process gas stream comprising hydrogen and a second process liquid stream comprising the light hydrocarbons are recovered from the purification zone. The contacting of the inlet stream within the indirect heat exchanger is discontinued. A regeneration stream comprising nitrogen and oxygen contacts the catalyst at regeneration conditions. At least a portion of the coke is combusted from the catalyst to produce a first flue gas stream comprising nitrogen, oxygen, and by-products of combustion including water. At least a portion of the first gas stream contacts the second surface within the indirect heater. While the portion of the first gas stream is heated in the indirect heater, oxygen in the first gas stream reacts with at least a portion of the sulfur deposited on the second surface to produce a second gas stream comprising the nitrogen, oxygen, water, and sulfur oxide. At least a portion of the second gas stream contacts the first surface within the indirect heat exchanger. While the portion of the second gas stream is cooled in the indirect heat exchanger, oxygen in the second gas stream reacts with at least a portion of the sulfur deposited on the first surface to produce a third gas stream comprising nitrogen, water, and sulfur oxide. At least a portion of the third flue gas stream is passed to the separation zone. A fourth flue gas stream comprising nitrogen, water, and sulfur oxide and having a first concentration of water, and a first waste liquid stream comprising water are recovered from the separation zone. At least a portion of the fourth flue gas stream is passed to the purification zone. A second waste liquid stream comprising water and a fifth flue gas stream comprising nitrogen, water, and sulfur oxide, and having a second concentration of water that is less than said first concentration are withdrawn from the purification zone. At least a portion of the sulfur oxide is removed from at least a portion of the fifth flue gas stream to produce a sixth flue gas stream comprising nitrogen. At least a portion of the sixth flue gas stream is heated in the indirect heat exchanger. The heated portion of the sixth flue gas stream is combined with oxygen to form the regeneration stream.

Additional objectives and embodiments of this invention are described in the detailed description of the invention.

INFORMATION DISCLOSURE

U.S. Pat. No. 2,792,337 Engel shows that oxygen-containing gas may be introduced into the catalyst bed without prior contact with parts of the reactor and feed inlet line and to pass part of the gas back through the forepart of the catalyst bed and the feed inlet line of the reactor and the remainder forward through the catalyst bed without recycling any part of the gas through the catalyst bed.

U.S. Pat. No. 2,873,176 Hengstebeck discloses that difficulties can be avoided by not exposing the sulfide scale in the heater tubes to free oxygen. Hengstebeck teaches to pass inert carrier gas through the heater and to inject sufficient oxygen to produce combustion of the carbonaceous material, usually designated as coke, into the carrier gas between the heater and the reactor.

U.S. Pat. No. 2,923,679 Thomson teaches that the heated oxygen-containing regeneration gases flow through the reforming unit in a direction which is the reverse of the flow of naphtha and hydrogen-containing gas.

U.S. Pat. No. 3,137,646 Capsuto suggests isolating various heavily sulfur-contaminated equipment of a hydrocarbon conversion unit, such as furnace and heat exchanger tubes, before contacting a deactivated catalyst with an oxygen-containing regeneration gas and to purge iron sulfide from the isolated heat exchanger tubes with high-temperature steam and/or an oxygen-containing gas. The freed particles of sulfide scale and/or sulfur dioxide-containing gas are then removed from the system.

U.S. Pat. No. 4,610,972 Hughes teaches a method of oxidizing sulfur compounds only to form sulfur dioxide and not sulfur trioxide which is said to be more harmful to the catalyst.

BRIEF DESCRIPTION OF THE DRAWING

The drawing is a simplified flow diagram of a catalytic reforming process having heaters and reactors in a series-flow arrangement of this invention.

DETAILED DESCRIPTION OF THE INVENTION

To reiterate, a broad embodiment of the present invention is a hydrocarbon-conversion process using a reverse flow of an oxygen-containing gas during regeneration to prevent contacting a sulfur-sensitive catalyst with sulfur contaminants. These sulfur contaminants result from prior processing of a sulfur-containing feed.

The conversion system of the present invention is an integrated processing unit which includes equipment, catalyst, sorbents and chemicals used in the processing of a hereinafter-defined hydrocarbon feedstock. The equipment includes reactors, reactor internals for distributing feed and containing catalyst, other vessels, heaters, heat exchangers, conduits, valves, pumps, compressors and associated components known to those of ordinary skill in the art. Preferably, the conversion system is a catalytic-reforming system.

The conversion system comprises either a fixed-bed reactor or a moving-bed reactor whereby catalyst may be continuously withdrawn and added. A fixed-bed reactor system is known to those of ordinary skill in the art as a semi-regenerative unit, which maintains operating severity by increasing reactor temperature, and which is eventually shut down for catalyst regeneration and reactivation. The preferred embodiment of the present invention is fixed-bed reactors in a semi-regenerative unit.

The feed to the conversion system may contact the respective particulate beds of catalyst in the reactors in either up-flow, down-flow, or radial-flow mode. Since the preferred dehydrocyclization reaction of the reforming system is favored by relatively low pressure, the low pressure drop in a radial-flow reactor favors the radial-flow mode.

The feed contaminants which were deposited on the equipment of the conversion system in a conversion process effected in the conversion system on a contaminant-containing feed comprise elements other than carbon or hydrogen, especially sulfur. As is well known, sulfur compounds present in hydrocarbon feeds in hydrocarbon conversion operations may result in formation of metal sulfides, e.g., by reaction of hydrogen sulfide with internal surfaces of such equipment as heaters, reactors, reactor internals and conduits. Sulfur may be released from such sulfides especially in an oxygen-employing regeneration step of a semi-regenerative reforming system, forming sulfur oxides such as sulfur dioxide and sulfur trioxide which join the circulating regeneration gases when combusting coke deposits on the reforming catalyst or when oxidizing the reforming catalyst.

The nature of equipment contamination from the processing of a contaminant-containing prior feed is not well known. Sulfur contamination, for example, may result from reaction products which remain on the equipment of a catalytic-reforming system. It is believed, without limiting the invention thereby, that highly condensed, aromatic compounds can be formed while processing reforming feeds by condensation of small amounts of higher-boiling, sulfur-containing components of the reforming feed. These compounds may not be entirely removed by the process reactants, but may instead accumulate on the equipment.

The amount of sulfur released during regeneration of a contaminant-sensitive catalyst may be minor relative to the circulating regeneration gases, particularly if the feed to the prior conversion process had been desulfurized or if the conversion system has been acidized or cleaned by other known chemical treatments prior to use in the process of the present invention. However, it has now been found that even minor amounts of sulfur can deactivate a catalyst selective for dehydrocyclization of paraffins, such as the sulfur-sensitive reforming catalyst described hereinafter.

The hydrocarbon feed comprises paraffins and naphthenes and may comprise olefins and mono- and polycyclic aromatics. The preferred feed boils within the gasoline range and may comprise gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 150°–210° C., or it may represent a narrower range within these broad ranges. For the sulfur-sensitive reforming catalyst described hereinafter, paraffinic stocks, such as naphthas from Middle East crudes, are especially preferred hydrocarbon feeds due to the ability of the process to dehydrocyclize paraffins to aromatics. Raffinates from aromatics extraction, containing principally low-value $C_6$–$C_8$ paraffins which can be converted to valuable B—T—X aromatics, are especially preferred.

Preferably, the hydrocarbon feed is substantially contaminant-free. Substantially contaminant-free is defined as a level of contaminant that, in the hydrocarbon feed, would not cause a shut down of the conversion system due to the deactivation of the contaminant-sensitive catalyst within a three-month period of operation. More preferably, the level of contaminant will be below detectable levels, by test methods known in the art. The hydrocarbon feed preferably has been treated by conventional methods such as hydrotreating, hydrorefining or hydrodesulfurization to convert sulfurous, nitrogenous and oxygenated compounds to $H_2S$, $NH_3$ and $H_2O$, respectively, which can be separated from the hydrocarbons by fractionation. This conversion preferably will employ a catalyst known to the art comprising an inorganic oxide support and metals selected from Groups VIB (6) and VIII (9–10) of the Periodic Table. [See Cotton and Wilkinson, *Advanced Organic Chemistry*, John Wiley & Sons (Fifth Edition, 1988)]. Alternatively or in addition to the conversion step, the feed may be contacted with sorbents capable of removing sulfurous and other contaminants. These sorbents may include but are not limited to zinc oxide, nickel-alumina, nickel-clay, iron sponge, high-surface-area sodium, high-surface-area alumina, activated carbons, molecular sieves, and manganese oxide, especially a manganous oxide.

In the preferred catalytic-reforming system, sulfur-free hydrocarbon feeds have low sulfur levels disclosed in the prior art as desirable reforming feedstocks, e.g., 1 ppm to 0.1 ppm (100 ppb). Most preferably, the hydrocarbon feed contains no more than 50 ppb sulfur.

The contaminant-sensitive catalyst is loaded into the conversion system after contaminants have been purged and the system is substantially contaminant-free. A method of purging the system of sulfur is described in U.S. Pat. No. 5,035,792 (Foutsitzis) which is incorporated herein.

The contaminant-sensitive catalyst contacts the hydrocarbon feed at hydrocarbon-conversion conditions. Hydrocarbon-conversion conditions comprise a pressure of from about atmospheric to 150 atmospheres (abs), a temperature of from about 200°–600° C., and a liquid hourly space velocity relative to the contaminant-sensitive catalyst of from about 0.2 to 10 $hr^{-1}$. Preferably the system is a sulfur-free catalytic-reforming system and the conditions comprise reforming conditions including a pressure of from about atmospheric to 60 atmospheres (abs). More preferably the pressure is from atmospheric to 20 atmospheres (abs), and excellent results have been obtained at operating pressures of less than 10 atmospheres. The hydrogen to hydrocarbon mole ratio is from about 0.1 to 10 moles of hydrogen per mole of hydrocarbon feed. Space velocity with respect to the volume of contaminant-sensitive catalyst is from about 0.5 to 10 hr-1. Operating temperature is from about 400°–560° C. Since the predominant reaction of the preferred embodiment is the dehydrocyclization of paraffins to aromatics, the contaminant-sensitive catalyst will preferably be contained in two or more reactors with interheating between reactors to compensate for the endothermic heat of reaction and maintain suitable temperatures for dehydrocyclization.

The contaminant-sensitive catalyst used in hydrocarbon conversion comprises one or more metal components on a refractory support. The metal component will comprise one or more from Groups IA (1), IIA (2), IVA (4), VIA (6), VIIA (7), VIII (8–10), IIIB (13) or IVB (14) of the Periodic Table. Applicable refractory supports are as described hereinafter. The contaminant-sensitive catalyst also may contain a halogen component, phosphorus component, or sulfur component.

The contaminant-sensitive catalyst preferably is a reforming catalyst, containing a non-acidic L-zeolite and a platinum-group metal component, which is highly sulfur-sensitive. It is essential that the L-zeolite be non-acidic, as acidity in the zeolite lowers the selectivity to aromatics of the finished catalyst. In order to be "non-acidic," the zeolite has substantially all of its cationic exchange sites occupied by nonhydrogen species. More preferably the cations occupying the exchangeable cation sites will comprise one or more of the alkali metals, although other cationic species may be present. An especially preferred nonacidic L-zeolite is potassium-form L-zeolite.

It is necessary to composite the L-zeolite with a binder in order to provide a convenient form for use in the catalyst of the present invention. The art teaches that any refractory inorganic oxide binder is suitable. One or more of silica, alumina or magnesia are preferred binder materials of the sulfur-sensitive reforming catalyst. The L-zeolite and binder may be composited to form the desired catalyst shape by any method known in the art.

A platinum-group metal component is another essential feature of the sulfur-sensitive reforming catalyst, with a platinum component being preferred. It is within the scope of the present invention that the catalyst may contain other metal components known to modify the effect of the preferred platinum component. Such metal modifiers may include Group IVA (14) metals, other Group VIII (8–10) metals, rhenium, indium, gallium, zinc, uranium, dysprosium, thallium and mixtures thereof. Catalytically effective amounts of such metal modifiers may be incorporated into the catalyst by any means known in the art.

Further details of the preparation and activation of embodiments of the sulfur-sensitive reforming catalyst are disclosed, e.g., in U.S. Pat. No. 4,619,906 (Lambert et al), U.S. Pat. No. 4,822,762 (Ellig et al.) and U.S. Pat. No. 5,035,792 (Foutsitzis), which are incorporated into this specification by reference thereto.

The detailed description of the drawing that follows consists of two parts. First, the conversion of hydrocarbons in the process is described. This processing of hydrocarbons results in the contamination of heaters and heat exchangers with sulfur and the deactivation of the catalyst in the reactors with carbon. Second, the regeneration of the catalyst is described. Also, this drawing is a simplified flow diagram of a catalytic reforming process in which are shown only those lines and other equipment necessary to illustrate one embodiment of the present invention. In locations where a single valve is shown in the drawing, it is known to those of ordinary skill in the art of hydrocarbon processing that other means for stopping or regulating flow through lines may be used, such as a blind, two valves, two valves separated by a conduit having a valved vent or bleed, pneumatically- or electronically-operated valves, etc.

Referring to the drawing, a hydrocarbon feed stream comprising $C_6$–$C_{10}$ hydrocarbons and sulfur contaminants enters the process through line 10. The hydrocarbon feed stream combines with a recycle stream comprising hydrogen from line 83 to form a combined feed stream in line 12. During hydrocarbon processing, valve 14 is open and valve 22 is closed. The combined feed stream passes through lines 16 and 18 and enters the combined feed heat exchanger 26. The combined feed heat exchanger 26 is a shell-and-tube type heat exchanger wherein the combined feed stream flows through the inside of the tubes 17 and the effluent from the third reactor 56 flows via line 58 through the shell of the exchanger around the outside of the tubes 17. In the combined feed heat exchanger 26 the combined feed is heated from about 100° F. (38° C.) to about 650° F. (343° C.) by exchanging heat with the effluent stream leaving the third reactor 56. Some sulfur in the combined feed stream deposits on the surfaces of the inside of the tubes 17. The heated combined feed stream passes through the line 28 to the charge heater 30. The charge heater 30 is an indirect fired heater wherein the heated combined feed stream flows through the inside of tubes 32, a fuel gas or fuel oil burns in the heater firebox outside the tubes 32, and the combined feed stream is heated by indirect heat transfer through the tubes 32. Additional sulfur in the combined feed stream deposits on the surfaces of the inside of the tubes 32. The temperature of the combined feed leaving the charge heater 30 in the line 34 is between about 900° F. (482° C.) and about 1000° F. (538° C.).

The hot combined feed in line 34 enters the first reactor 36 of three reactors in series (36, 46 and 56) that each contain a sulfur-sensitive reforming catalyst. In each reactor, dehydrocyclization reactions take place and the net effect of all the reactions that take place in each reactor is generally endothermic. In addition, most of the sulfur that is still remaining in the combined feed stream leaving the charge heater 30 deposits on the catalyst in the first reactor 36, so that only a small and practically inconsequential fraction of the sulfur that was originally in the hydrocarbon feed stream is present in the effluent stream in line 38. Consequently, when the effluent stream from the first reactor 36 passes through the first interheater 40, which is an indirect fired heater and which reheats the effluent stream in line 38 to reforming temperature, a negligible amount of sulfur deposits on the inner surfaces of the tubes 42 in the first interheater 40.

The effluent from the first interheater 40 passes through the line 44 to the second reactor 46, where additional dehydrocyclization reactions occur. The effluent of the second reactor 46 passes through the line 48 to the second interheater 50 which is an indirect fired heater. A negligible amount of sulfur deposits on the tubes 52 of the second interheater 50. The effluent from the second interheater 50 passes through the line 54 to the third reactor 56. The effluent from the third reactor comprises hydrogen, light hydrocarbons (e.g., $C_1$–$C_4$), and heavy hydrocarbons. The effluent from the third reactor 56 passes through the line 58 to the shell-side of the combined feed exchanger 26, wherein heat is transferred from the effluent stream to the combined feed stream.

After cooling in the combined feed exchanger 26, the reactor effluent stream passes through the line 60. During hydrocarbon processing, valve 109 is closed and valve 64 is open. Therefore, the effluent stream passes through the line 62, the valve 64, and the lines 66 and 68. Valve 142 is closed, and so the effluent stream passes through line 70 to the cooler 72, where the effluent stream is further cooled by cooling water as shown, or by ambient air to about 100° F. (38° C.). The cooled effluent flows through the line 74 to the gas-liquid separator 76. The liquid, heavier hydrocarbons in the reactor effluent stream exit the separator 76 through the line 108. During hydrocarbon processing, valve 116 is closed and valve 110 is open, and so the liquid hydrocarbons pass through the line 112 to downstream separation facilities, such as fractionation columns which are not shown.

The hydrogen and light hydrocarbons in the reactor effluent stream leave the separator 76 as a gas stream through the line 75. During hydrocarbon processing, valve 80 is open and valve 102 is closed, and so the total gas stream passing through line 75 splits into two portions—a recycle gas stream that passes through line 78 and a net or excess gas stream that passes through line 77. The portion of the gas leaving the separator 76 that becomes the recycle gas stream is recycled to the reactors as recycle gas through the line 78, valve 80, and line 81 to the suction of the recycle compressor 82. From the discharge of the recycle compressor 82, the recycle gas flows through the line 83 to combine with the hydrocarbon feed entering the process via line 10.

A portion of the gas leaving the separator 76 comprises the net or excess gas from the reforming reactions and pass through the lines 77 and 79 to the suction of the net gas compressor 84. Although the drawing shows the net gas compressor 84 as only a single stage of net gas compression, where a high discharge pressure is desired it may be either preferable or more economical to employ more than one stage (e.g., two or three stages) of compression. Where multiple stages of net gas compression are employed, interstage cooling may be employed to remove the heat of compression and interstage separators may be employed to remove condensed hydrocarbons. From the discharge of the net gas compressor 84, the gas flows through line 85 to a cooler 86, where the effluent stream is cooled to between −10° F. and 150° F. (−23° C. and 66° C.) using cooling water or a refrigerant, depending on the desired temperature. More of the light hydrocarbons that are present in the gas stream flowing through the line 85 are condensed in the cooler 86 when the operating pressure of the cooler 86 is higher or when the operating temperature of the cooler 86 is lower. The cooled effluent flows through the line 87 to the gas-liquid separator 90. The condensed, light hydrocarbons in the cooler effluent stream exit the separator 90 as a liquid through the line 88. During hydrocarbon processing, valve 90 is closed and valve 92 is open, and so the liquid hydrocarbons pass through the line 94 to downstream separation facilities, such as fractionation columns which are not shown. Hydrogen and other uncondensed light hydrocarbons in the cooler effluent stream exit the separator 90 via the line 95. During hydrocarbon processing, valve 100 is closed and valve 98 is open, and so the net gas stream flows through valve 98 and the line 99 to downstream facilities, such as gas compression for use in other process units.

The description in the preceding paragraph of the operation of the compressor 84, cooler 86, and separator 90 is an illustration of one flow scheme for recovering light hydrocarbons from, and increasing the hydrogen purity of, the net gas of a catalytic reforming unit. It is not intended for this description to limit the scope of the present invention as claimed. Instead, this description is intended to point out three important steps used in the processing of the net gas streams of many commercial catalytic reforming processes, namely compression, cooling, and separation. Other flow schemes for processing the net gas stream that are suitable for use in the present invention include the processes described in U.S. Pat. Nos. 4,333,819 and 4,568,451, which are incorporated herein.

After an appropriate processing period, the catalyst in the reactors 36, 46 and 56 becomes deactivated by the deposition of coke. Coke is comprised primarily of carbon but is also comprised of a relatively small quantity of hydrogen. In order to remove the coke from the catalyst in a semi-regenerative process as shown in the drawing, the catalyst is contacted in situ with an oxygen-containing gas stream. Prior to the introduction of oxygen into the process, the reactor circuit, which includes the reactors, heaters, combined feed heat exchanger, separator, recycle compressor, and interconnecting conduits, is freed of hydrogen and hydrocarbons by steps known to those skilled in the art of catalytic hydrocarbon processing. These steps may include discontinuing the introduction of hydrocarbon, isolating the reactor section and the net gas section from other process equipment, stopping the recycle gas compressor and net gas compressor, depressuring the reactor circuit to atmospheric pressure, draining liquid hydrocarbons, evacuating the reactor circuit to sub-atmospheric pressure, and purging with an inert gas such as nitrogen. Once the reactor circuit is freed of hydrogen and hydrocarbon, the positions of the valves in the reactor circuit are changed in preparation for regeneration: valves 14, 64, 80, 92, 98, and 110 are closed and valves 22, 100, and 109 are opened.

The reactor is pressurized with nitrogen through line 106 by opening valve 104, and the net gas compressor 84 is restarted. The flow of the recirculating nitrogen is as follows. Nitrogen flows from the discharge of the net gas compressor 84, through line 85, cooler 86, and line 87, and into separator 90. Nitrogen exits separator 90 via line 96, and flows through valve 100, line 101, and line 108. Nitrogen flows through sorbent bed 105 described hereinafter. Nitrogen exits sorbent bed 105 and flows through line 107 and pressure-reducing valve 109, which reduces the pressure of the flowing nitrogen from the relatively-high pressure associated with the discharge of the net gas compressor 84 to the relatively-low pressure associated with the reactors 36, 46, and 56. By relatively-high pressure, it is meant that the nitrogen pressure upstream of pressure-reducing valve 109 is between 25 psig and 3000 psig, and more commonly between 75 psig and 500 psig. By relatively-low pressure, it is meant that the nitrogen pressure downstream of pressure-reducing valve 109 is between atmospheric pressure and 300 psig, and more commonly between 25 psig and 75 psig. From the pressure-reducing valve 109, nitrogen flows through lines 100 and 60 to the effluent side of the combined-feed exchanger 26. Because the nitrogen flows on the effluent side of the tubes 17 in the combined feed exchanger 26 the nitrogen does not contact the sulfur deposited on the feed side of the tubes 17. Nitrogen then flows through the reactor circuit in a direction opposite to the flow of hydrocarbons during normal operation. Nitrogen flows through line 58, reactor 56, line 54, and tubes 52 of heater 50. From heater 50, nitrogen flows through line 48, reactor 46, line 44, tubes 42 of heater 40, line 38, reactor 36, and to line 34. Generally, reactor 36 is the first piece of equipment in which the nitrogen contacts surfaces that have sulfur deposits, because the internal surfaces or the upper section of reactor 36 may have sulfur deposits. The pieces of equipment that may have sulfur deposits that the nitrogen contacts, in the order of the nitrogen flow, are reactor 36, line 34, tubes 32 of heater 30, line 28, and the feed-side of tubes 17 of combined-feed exchanger 26. From the combined feed exchanger 26, the nitrogen flows through the lines 18 and 20, valve 22, lines 24 and 68, line 70, cooler 72, line 74, and to the separator 76. The nitrogen leaves the separator 76 through the lines 75, 77, and 79, and returns to the suction of the net gas compressor 84.

Once this recirculating nitrogen flow is established, a caustic solution of water and sodium hydroxide is introduced through line 128 and valve 126 in order to establish an inventory of the caustic solution in the separator 76. Valves 116 and 142 are opened, and the pump 138 is started. The caustic solution recirculates from the discharge of pump 138, through line 140, valve 142, lines 144 and 70, the cooler 72, line 74, and to separator 76. From the separator 76, the caustic solution flows back to the pump 138 through lines 108 and 114, valve 116, and lines 118, 124, 130, and 136. At the junction of lines 144, 68 and 70, the recirculating caustic solution in line 144 contacts the recirculating nitrogen in line 68. This contacting of liquid and gas continues in lines 70, cooler 72, and line 74 and until the liquid caustic solution and the nitrogen gas separate in the separator 76. Because the circulating gas comprises only nitrogen at this stage, the circulating caustic solution does not wash or scrub sulfur oxides from the circulating gas. At this stage, the circulation of the caustic solution is established only in anticipation of the next steps of the regeneration, namely, heating the recirculating nitrogen gas and introducing air.

The circulating nitrogen gas is heated by the three heaters, 30, 40, and 50, and by the combined feed exchanger 26. Once the heaters are started, heater 50 heats the gas entering reactor 46 via line 48 to the desired temperature and heater 40 heats the gas entering reactor 36 via line 38 to the desired temperature. Heater 30 heats the gas entering combined feed exchanger 26 via line 28 to a sufficient temperature so that when the gas in line 28 transfers heat to the gas in line 60 through the tubes 17 of exchanger 26, the gas entering reactor 56 via line 58 is heated to the desired temperature.

After the reactors are at the desired temperature, air is introduced into the circulating nitrogen gas through line 55 by opening valve 57. Compressed, ambient air is a suitable source of air to line 55. Preferably, but not necessarily, the air is dried so that the concentration of water is less than 5 v-ppm. The air is introduced until the concentration of oxygen in the gas entering reactor 56 via line 58, as measured by an oxygen analyzer, is preferably between 0.5–0.9 mol-%. In the presence of oxygen, the coke on the catalyst in reactor 56 begins to burn. Generally, most of the oxygen that enters reactor 56 is consumed in the combustion of the coke, so that until most of the coke is burned in reactor 56, the concentration of oxygen in the flue gas leaving reactor 56 via line 54 is low, generally less than 0.2 mol-%. This flue gas circulates through the other reactors, heaters, and equipment, following the same route as that described previously for nitrogen and ultimately reaching line 77. A portion of the recirculating flue gas is vented through valve 102 and line 103 at a rate roughly equal to the rate of introduction of air through line 55. In this manner, the pressure of the circulating regeneration gases, and the concentration of oxygen in the gas stream entering reactor 56 via line 58, are maintained at steady-state conditions.

As described in the preceding paragraph, while coke is burning in reactor 56, the concentration of oxygen in the gas leaving reactor 56 via line 54 is generally low. Therefore, the burning of coke in reactor 46 generally does not begin until most of the burning of coke in reactor 56 is completed and higher concentrations of oxygen are present in the gas in line 48. Then, the coke burning proceeds through reactor 46, during which burning the oxygen concentration in line 44 is generally low and little combustion occurs in reactor 36. When burning of coke in reactor 46 is nearly completed, burning of coke in reactor 36 proceeds, in a manner similar to that of reactor 46 and 56. Therefore, the gas stream in line 34 leaving reactor 36 has a low concentration of oxygen until most of the coke is burned in all three reactors 56, 46, and 36.

The progression of the coke burning through reactors 56, 46, and 36, as described in the preceding paragraph, is referred to herein a "reverse-series burn" because the burning progresses through the reactors in a sequential or series manner and in a direction opposite to the flow of hydrocarbons during normal operation. In a "reverse-series burn," the oxygen for coke-burning is introduced into the circulating regeneration gases at only one location, namely at a convenient, accessible location near to the location where the regeneration gases enter the initial reactor of a series of reactors. In the drawing, the initial reactor in the series of reactors is reactor 56, and air for a "reverse-series burn" is introduced at the junction of lines 55 and 58. An alternative to a "reverse-series burn" is what is referred to herein as a "reverse-parallel burn." In a "reverse-parallel burn," the oxygen for coke burning is introduced simultaneously into the circulating regeneration gases at more than one location, and commonly two locations. One of the locations for introducing oxygen for coke burning in a "reverse-parallel burn" is the same location as that used for a "reverse-series burn." Where only one other location is used, the second location is a convenient, accessible location near to where the regeneration gases have passed serially through about the first one-half of the catalyst in all the reactors, as computed from the location where the regeneration gases enter the initial reactor of a series of reactors. In the drawing, and presuming that 20% of the total catalyst in all the reactors is in reactor 36, 30% is in reactor 46, and 50% is in reactor 56, then the second location for introducing air for a "reverse-parallel burn" is at the junction of lines 45 and 48. Thus, for a "reverse-parallel burn," air is introduced into the circulating nitrogen gas not only through line 55 by opening valve 57, but simultaneously through line 45 by opening valve 47. The advantage of a "reverse-parallel burn" is roughly a reduction by 50% in the elapsed time for burning coke from the catalyst. This is because the coke on the second one-half of the catalyst (reactors 46 and 36) begins to burn at the same time, rather than after, the coke on the first one-half of the catalyst (reactor 56) burns. In a "reverse-parallel burn," as in a "reverse-series burn," the gas stream in line 34 leaving reactor 36 generally has a low concentration of oxygen until most of the coke is burned in all three reactors 56, 46, and 36.

While coke is burning in the reactors, the amount of heat transfer required of the heaters 30, 40, and 50, and of the combined feed exchanger 26 may change dramatically from the situation described previously for the heating of the circulating nitrogen gas prior to the introduction of air. Because the combustion of coke is exothermic, the temperature of the regeneration gases leaving a reactor in which coke is burning may be significantly higher than the temperature of the regeneration gases entering a reactor. In such circumstances, a heater through which regeneration gases leaving a reactor pass may not be needed at all for heating the gases prior to their entry into the next reactor. In fact, where cooling is required, with an appropriate reduction in the rate of firing and a properly-adjusted draft, a fuel-fired radiant or convective heater may be usefully employed to cool the regeneration gases leaving a reactor to a lower, desired temperature for the regeneration gases entering the next reactor. Thus, during catalyst regeneration, the heaters 50 and 40 may at times not be required for their heating function per se, although they still perform a necessary function as a kind of a conduit for routing the regeneration gases from reactor 56 to reactor 46 and from reactor 46 to reactor 36, respectively. Similarly, at times during the combustion of coke in reactor 36 where the regeneration gases in line 34 are sufficiently hot, the heater 30 may not be required for heating the regeneration gases in line 34. In other words, provided that the temperature of the regeneration gases in line 34 is sufficiently high, the heat transfer capability of exchanger 26 is sufficiently large, and the desired inlet temperature for the regeneration gases entering reactor 56 via line 58 is sufficiently low, then at some times the necessary amount of heat transfer via exchanger 26 to achieve the desired temperature for the regeneration gases entering reactor 56 via line 58 may be attainable without the need for additional heating by heater 30. It is believed, however, that in a commercial reforming process the duration and benefit of this result would be outweighed by the expense of the combined feed exchanger that would be necessary to achieve the result.

During this coke burning, whenever some oxygen is present in the gas leaving reactor 36 via line 34, there is a possibility for some of the previously-described sulfur-containing deposits on the inner surfaces of reactor 36, line 34, tubes 32, line 28, and tubes 17 to be converted to sulfur oxide. By "sulfur oxide" it is meant a gaseous compound comprising sulfur and oxygen, such as, but not limited to, sulfur dioxide and sulfur trioxide. It is known that sulfur dioxide and sulfur trioxide generally form, although to different extents, when oxygen contacts sulfur-containing deposits on hydrocarbon conversion processes at coke-burning conditions. Although the concentration of the sulfur oxides present in the gas that ultimately exits the combined feed exchanger 17 via line 18 is relatively low while the concentration of oxygen is low, this concentration increases as the concentration of oxygen in the gas leaving reactor 36 via line 34 increases and more oxygen is available to react with the sulfur deposits.

Sulfur oxide that is formed either in reactor 36, line 34, tubes 32, line 28, or tubes 17 ultimately appears in the circulating regeneration gas flowing through line 18. As described previously, this gas flows through lines 20, 24, and 68. At the junction of lines 68 and line 144, the gas contacts a stream of caustic solution flowing through line 144. By caustic solution, it is meant an aqueous solution of a base comprising a Group IA (1) or Group IIA (2) element, such as sodium, potassium, and calcium, including sodium hydroxide as described previously, but also including potassium hydroxide and calcium hydroxide. The Group IA (1) or Group IIA (2) base reacts with the sulfur oxide, thereby removing it from the circulating gases. Intimate mixing of the caustic solution and the regeneration gas stream at the junction of lines 68 and 144, and in line 70 is advantageous to promote the reaction and removal of the sulfur oxide from the gas stream. Those skilled in the art of gas-liquid contacting are able to design suitable liquid and gas distributors and mixing devices to ensure intimate contacting of the liquid and gas streams and promote the removal of sulfur oxide from the gas stream. As described previously, the caustic solution is separated from the gas stream in the separator 76, as described previously, and is recirculated to line 144 by pump 138.

In order to help ensure removal of the sulfur oxide from the gas stream, an adequate concentration of Group IA (1) or IIA (2) element that has not yet reacted with sulfur oxide must be maintained in the circulating caustic stream. Preferably, the molar ratio of such unreacted Group IA (1) or IIA (2) in the circulating caustic stream in line 144 to sodium oxide in the circulating nitrogen stream in line 68 is greater than one. For the concentrations of sulfur oxide expected in the circulating regeneration gases in line 68, and where the caustic solution is sodium hydroxide and water, the caustic solution generally has a total alkalinity of 1.5–2.0 wt-% NaOH equivalents or more, a pH of 7–8, and a solids concentration below 6–7 wt-% to avoid foaming. In order to maintain the desired steady state concentration of the caustic solution in the stream 144, a portion of the circulating stream of caustic solution is at least intermittently withdrawn by opening valve 120, withdrawing the caustic solution through line 122, and routing the caustic solution to disposal. To compensate for the caustic solution that is withdrawn, fresh, make-up caustic solution is added at least intermittently through line 128 by opening valve 126. If necessary to control the concentration or volume of the circulating caustic solution, fresh water may be added through line 134 by opening valve 132. The concentration of the circulating caustic solution can be measured by sampling and using known analytical methods.

After being contacted with the caustic solution and separated from the caustic solution in the separator 76, the regeneration gases exit the separator through line 75. If the concentration of sulfur oxide in the regeneration gases in line 75 is sufficiently low that its adverse effect on the sulfur-sensitive catalyst is not significant, then in one of this invention's embodiment that is not shown in the drawing the regeneration gases in line 75 may be recycled to the effluent side of the combined feed exchanger 26 by the recycle compressor 82, instead of by the net gas compressor 84. Thus, in this embodiment, instead of passing through line 77 and 79 to the net gas compressor 84, the circulating regeneration gases would pass through line 78, valve 80, line 81, and to the suction of recycle gas compressor 82. From the discharge of recycle gas compressor 82, the regeneration gases would be routed via a jumper line (not shown in the drawing) to line 100 or line 62, and then to the effluent side of the combined feed exchanger 26. Leaving the outlet of the combined feed exchanger in line 58, the regeneration gases would flow in reverse direction through the reactors 56, 46, and 36, and their associated heaters 50, 40, and 30, as described previously. From heater 30, the regeneration gases would follow the flow path through the feed side of the combined feed exchanger 26, through valve 22, past the caustic solution injection point at the junction of lines 144 and 68, through cooler 62, and back to separator 76, as also described previously.

If, on the other hand, the concentration of sulfur oxide in the regeneration gases in line 75 is so high that its adverse effect on the sulfur-sensitive catalyst is significant, then more of the sulfur oxide in the regeneration gases in line 75 may be removed using a bed of sorbent that sorbs the sulfur oxide from the regeneration gases. It is believed that suitable sorbents for the sorption of sulfur oxide include molecular sieves, such as 5A molecular sieve, and promoted aluminas, such as Puraspec 2130 which is a commercially-available promoted alumina available from ICI-Katalco (Oakbrook Terrace, Ill., USA). It is believed that a sorbent bed of molecular sieve (but not Puraspec 2130 promoted alumina) would necessarily be sized to have a capacity to sorb not only the sulfur oxide contained in any gas stream flowing through it, but to sorb the water contained in the gas stream flowing through it as well. This is because it is believed that molecular sieve does not selectively sorb sulfur oxide in the presence of water. Instead, it is believed that molecular sieve sorbs both sulfur oxide and water. Because of the contacting of the regeneration gases with the caustic solution, the water content of the regeneration gases in line 75 is relatively high compared to the sulfur oxide content. Consequently, the size and capacity of the sorbent bed of molecular sieve will generally be controlled more by the water content of the gas stream that passes through the sorbent bed than by the sulfur oxide content. Thus, although such a sorbent bed of molecular sieve may be incorporated into the embodiment described in the preceding paragraph, say at a location in the jumper line (not shown in the drawing) from the discharge of the recycle compressor 82 to either line 100 or line 62, the size of such a sorbent bed would be relatively large. In contrast, it is believed that a sorbent bed of Puraspec 2130 promoted alumina selectively sorbs sulfur oxide in the presence of water. Consequently, the size and capacity of a bed of Puraspec 2130 promoted alumina will generally be controlled more by the sulfur oxide content of the gas stream that passes through the sorbent bed than by the water content. Thus, it is believed that the size of a bed of Puraspec 2130 promoted alumina that is incorporated into the previously-described jumper line would be smaller than a bed of molecular sieve. One of ordinary skill in the art of sorption engineering is able to choose the more economical sorbent based on the relative performances and prices of the sorbents.

In a preferred embodiment, the size of a bed of sorbent that does not selectively sorb sulfur oxide in the presence of water may be reduced by removing water from the regeneration gases in line 75 prior to passing the gases through the sorbent bed. In this embodiment, which is shown in the drawing, the equipment in the net gas purification section is employed to reduce the water content. Typically, during the regeneration of the catalyst in a semi-regenerative reforming process, the net gas compression section sits idle because no net gas is produced. In this preferred embodiment, this idle equipment is put to use in removing water from the regeneration gases in line 75 by compression, cooling, and separation.

Referring again to the drawing, in the preferred embodiment described in the preceding paragraph, the regeneration gases in line 75, except for the portion that is vented through valve 102 and line 103, pass through line 77 and 79 to the suction of the net gas compressor 84. From the discharge of the net gas compressor 84, the gases pass through the line 85, the cooler 86, and to the separator 90. The net gas compressor 84 and the net gas cooler 86 are operated at conditions sufficient to achieve in the separator a pressure of between 25 psig and 3000 psig, and more commonly between 75 psig and 500 psig, and temperature of between 32° F. and 150° F., and more commonly between 35° F. and 60° F. Consequently, the water content of the regeneration gases leaving separator 90 via line 95 is generally less than 10 mol-%, preferably less than 500 mol-ppm, and more preferably less than 50 mol-ppm.

The regeneration gases in line 95 flow through line 96, valve 100, lines 101 and 108, and to the sorbent bed 105. For removal of the same amount of sulfur oxide, a sorbent bed of molecular sieve in the location of bed 105 in the drawing is significantly smaller in both size and cost than a sorbent bed of molecular sieve in the jumper line of the other embodiment described previously. From the outlet of bed 105, the regeneration gases flow through line 107, pressure-reducing valve 109, line 100, line 60, exchanger, line 58 and to reactor 56.

Circulation of nitrogen and oxygen through the sulfur-contaminated equipment, which is generally reactor 36, line 34, tubes 32, line 28, and tubes 17, may be maintained until the concentration of sulfur oxide in the gas in line 18 is not detectable as measured by sniffer tubes, which have a lower limit of detection of about 0.1–0.5 ppm. In order to accelerate the conversion of the sulfur deposits after the combustion of coke is complete, the temperature and oxygen concentration may be increased. This increase in temperature and oxygen concentration may be done as a separate step that is in addition to the steps necessary for catalyst regeneration. Alternatively, these increases may be incorporated in whole or in part into the oxidation of the sulfur-sensitive catalyst. This is possible because, following the combustion of the coke deposits, the sulfur-sensitive reforming catalyst generally will be oxidized at a temperature of about 3000 to 550° C. (preferably about 350° C.) in an air atmosphere for 0.5 to 10 hours. Therefore, as during the coke burning step, and in accord with this invention to help preclude contacting the sulfur-sensitive catalyst with sulfur oxides, reverse flow through the reactors and the heaters may be maintained during the oxidation step. Preferably the oxidized catalyst is subjected to a substantially water-free reduction step at a temperature of about 300° to 550° C. (preferably about 350° C.) for 0.5 to 10 hours or more. The duration of the reduction step should be only as long as necessary to reduce the platinum, in order to avoid pre-deactivation of the catalyst, and may be performed in-situ as part of the plant start-up if a dry atmosphere is maintained.

What is claimed is:

1. A method of contacting a sulfur-sensitive catalyst with oxygen in a catalytic hydrocarbon conversion process employing said sulfur-sensitive catalyst and comprising a means for indirect heat exchange comprising a surface on which sulfur is deposited, which method comprises:

(a) contacting a feed stream comprising hydrocarbons and sulfur with a surface of a means for indirect heat exchange, depositing sulfur on said surface, and producing a charge stream comprising hydrocarbons;

(b) contacting said charge stream with a bed of sulfur-sensitive catalyst;

(c) discontinuing said contacting of said feed and charge streams;

(d) contacting a regeneration stream comprising an inert compound and oxygen with said catalyst and withdrawing from said bed a first gas stream comprising said inert compound and oxygen;

(e) contacting at least a portion of said first gas stream with said surface, reacting oxygen with at least a portion of the sulfur deposited on said surface to produce sulfur oxide, heat exchanging in said means for indirect heat exchange said portion of said first gas stream, and producing a second gas stream comprising said inert compound and sulfur oxide;

(f) removing at least a portion of the sulfur oxide from at least a portion of said second gas stream, and producing a third gas stream comprising said inert compound;

(g) heat exchanging in said means for indirect heat exchange at least a portion of said third gas stream; and, (h) combining at least a portion of the heat-exchanged portion of said third gas stream and oxygen to form said regeneration stream.

2. The method of claim 1 wherein said portion of said first gas stream is cooled in Step (e) and said portion of said third gas stream is heated in Step (g).

3. A method of contacting a sulfur-sensitive catalyst with oxygen in a catalytic hydrocarbon conversion process employing said sulfur-sensitive catalyst, comprising a means for indirect heat exchange comprising a first surface on which sulfur is deposited, and comprising a means for heat exchange comprising a second surface on which sulfur is deposited, which method comprises:

(a) contacting an inlet stream comprising hydrocarbons and sulfur with a first surface of a means for indirect heat exchange, depositing sulfur on said first surface, and producing a feed stream comprising hydrocarbons and sulfur;

(b) contacting said feed stream with a second surface of a means for heat exchange, depositing sulfur on said second surface, and producing a charge stream comprising hydrocarbons;

(c) contacting said charge stream with a bed of sulfur-sensitive catalyst;

(d) discontinuing said contacting of said inlet, feed, and charge streams;

(e) contacting a regeneration stream comprising an inert compound and oxygen with said catalyst and withdrawing from said bed a first gas stream comprising said inert compound and oxygen;

(f) contacting at least a portion of said first gas stream with said second surface, reacting oxygen with at least a portion of the sulfur deposited on said second surface to produce sulfur oxide, heat exchanging in said means for heat exchange said portion of said first gas stream, and producing a second gas stream comprising said inert compound and sulfur oxide;

(g) contacting at least a portion of said second gas stream with said first surface, reacting oxygen with at least a portion of the sulfur deposited on said first surface to produce sulfur oxide, heat exchanging in said means for indirect heat exchange said portion of said second gas stream, and producing a third gas stream comprising said inert compound and sulfur oxide;

(h) removing at least a portion of the sulfur oxide from at least a portion of said third gas stream, and producing a fourth gas stream comprising said inert compound;

(i) heat exchanging in said means for indirect heat exchange at least a portion of said fourth gas stream; and, (j) combining said heat-exchanged portion of said fourth gas stream and oxygen to form said regeneration stream.

4. The method of claim 3 wherein said regeneration stream passes through said bed in a direction countercurrent to the direction that said charge stream passes through said bed.

5. The method of claim 3 wherein said first gas stream passes through said means for heat exchange in a direction countercurrent to the direction that said feed stream passes through said means for heat exchange.

6. The method of claim 3 wherein said second gas stream passes through said means for indirect heat exchange in a direction countercurrent to the direction that said inlet stream passes through said means for indirect heat exchange.

7. The method of claim 3 wherein sulfur oxide is removed from said portion of said heat-exchanged second gas stream by contacting said heat-exchanged second gas stream with a wash solution comprising water and a Group IA (1) or Group IIA (2) element to produce a mixture, and said third gas stream is recovered from said mixture.

8. The method of claim 3 wherein sulfur oxide is removed from said portion of said heat-exchanged second gas stream by sorption on a sorbent.

9. The method of claim 8 wherein said sorbent comprises a molecular sieve or alumina.

10. The method of claim 3 wherein said portion of said second gas stream is cooled in Step (g) and said portion of said third gas stream is heated in Step (i).

11. The method of claim 3 wherein said portion of said first gas stream is heated in said means for heat exchange.

12. A method of combusting coke from a sulfur-sensitive catalyst using oxygen in a catalytic hydrocarbon conversion process employing said catalyst, comprising an indirect heat exchanger comprising a first surface on which sulfur is deposited, and comprising an indirect heater comprising a second surface on which sulfur is deposited, which method comprises:

(a) contacting an inlet stream comprising hydrocarbons and sulfur with a first surface within an indirect heat exchanger, depositing sulfur on said first surface while heating said inlet stream, and producing a feed stream comprising hydrocarbons and sulfur; contacting said feed stream with a second surface within an indirect heater, depositing sulfur on said second surface while heating said feed stream, and producing a charge stream comprising hydrocarbons; contacting said charge stream with a sulfur-sensitive hydrocarbon conversion catalyst within a fixed bed at hydrocarbon conversion conditions, and deactivating said catalyst by depositing coke on said catalyst; withdrawing from said catalyst an effluent stream comprising hydrogen, light hydrocarbons, and heavy hydrocarbons; passing said effluent stream to a separation zone; recovering from said separation zone a first process gas stream comprising hydrogen and said light hydrocarbons and a first process liquid stream comprising said heavy hydrocarbons; passing said first process gas stream to a purification zone; and recovering from said purification zone a second process gas stream comprising hydrogen and a second process liquid stream comprising said light hydrocarbons;

(b) discontinuing said contacting of said inlet stream within said indirect heat exchanger;

(c) contacting a regeneration stream comprising nitrogen and oxygen with said catalyst at regeneration conditions sufficient to combust at least a portion of said coke and to produce a first flue gas stream comprising nitrogen, oxygen, and by-products of combustion including water;

(d) contacting at least a portion of said first flue gas stream with said second surface within said indirect heater, reacting oxygen with at least a portion of the sulfur deposited on said second surface to produce sulfur oxide while heating said portion of said first flue gas stream, and producing a second flue gas stream comprising nitrogen, oxygen, water, and sulfur oxide;

(e) contacting at least a portion of said second flue gas stream with said first surface within said indirect heat exchanger, reacting oxygen with at least a portion of the sulfur deposited on said first surface to produce sulfur oxide while cooling said portion of said second flue gas stream, and producing a third flue gas stream comprising nitrogen, water, and sulfur oxide;

(f) passing at least a portion of said third flue gas stream to said separation zone, recovering from said separation zone a fourth flue gas stream comprising nitrogen, water, and sulfur oxide and having a first concentration of water and a first waste liquid stream comprising water;

(g) passing at least a portion of said fourth flue gas stream to said purification zone, and withdrawing therefrom a second waste liquid stream comprising water and a fifth flue gas stream comprising nitrogen, water, and sulfur oxide, and having a second concentration of water that is less than said first concentration;

(h) removing at least a portion of the sulfur oxide from at least a portion of said fifth flue gas stream, and producing a sixth flue gas stream comprising nitrogen;

(i) heating in said indirect heat exchanger at least a portion of said sixth flue gas stream;

(j) combining the heated portion of said sixth flue gas stream and oxygen to form said regeneration stream.

13. The method of claim 12 wherein said purification zone comprises a cooling zone, and said cooling zone operates at a temperature of from 32° F. to 150° F.

14. The method of claim 12 wherein said purification zone comprises a compression zone, and said compression zone operates at a pressure of from 25 psig to 3000 psig.

15. The method of claim 12 wherein sulfur oxide is removed from said portion of said fifth flue gas stream by sorption on a sorbent.

16. The method of claim 15 wherein said sorbent comprises a molecular sieve or alumina.

17. The method of claim 12 further characterized in that said portion of said third flue gas stream is contacted with a wash stream comprising water and a Group IA (1) or Group IIA (2) element to produce a washed third flue gas stream, and said washed third flue gas stream is passed to said separation zone.

18. The method of claim 12 wherein said second concentration is less than 10 mol-% water.

* * * * *